(12) United States Patent
Moretti (10) Patent No.: US 9,238,478 B2
(45) Date of Patent: Jan. 19, 2016

(54) METHOD FOR DETERMINING THE ABSOLUTE ANGULAR POSITION OF THE STEERING WHEEL OF A MOTOR VEHICLE

(71) Applicant: JTEKT EUROPE, Irigny (FR)

(72) Inventor: Romain Moretti, Soucieu en Jarrest (FR)

(73) Assignee: JTEKT EUROPE (FR)

(*) Notice: Subject to any disclaimer, the term of this patent is extended or adjusted under 35 U.S.C. 154(b) by 0 days.

(21) Appl. No.: 14/413,000

(22) PCT Filed: Jun. 10, 2013

(86) PCT No.: PCT/FR2013/051336
§ 371 (c)(1),
(2) Date: Jan. 5, 2015

(87) PCT Pub. No.: WO2014/006289
PCT Pub. Date: Jan. 9, 2014

(65) Prior Publication Data
US 2015/0151784 A1 Jun. 4, 2015

(30) Foreign Application Priority Data
Jul. 6, 2012 (FR) ...................................... 12 56521

(51) Int. Cl.
*B62D 5/04* (2006.01)
*B62D 15/02* (2006.01)
*B62D 6/08* (2006.01)

(52) U.S. Cl.
CPC ................ *B62D 5/0481* (2013.01); *B62D 6/08* (2013.01); *B62D 15/024* (2013.01); *B62D 15/0235* (2013.01); *B62D 15/0245* (2013.01)

(58) Field of Classification Search
CPC .......... B62D 7/159; B62D 6/04; B62D 6/003; B60T 2260/02; B60T 8/17554
See application file for complete search history.

(56) References Cited

U.S. PATENT DOCUMENTS

| | | | | |
|---|---|---|---|---|
| 8,712,646 B2 * | 4/2014 | Michelis et al. | ................. | 701/42 |
| 2011/0301815 A1 * | 12/2011 | Koukes et al. | ................. | 701/42 |
| 2013/0024072 A1 * | 1/2013 | Michelis | ............ | B62D 15/0235 |
| | | | | 701/42 |

FOREIGN PATENT DOCUMENTS

| | | |
|---|---|---|
| DE | 102007021625 A1 | 11/2008 |
| DE | 102008063567 A1 | 4/2010 |

(Continued)

OTHER PUBLICATIONS

International Search Report issued Sep. 12, 2013 re: Application No. PCT/FR2013/051336; citing: FR 2 953 181 A1, EP 1 375 304 A2, DE 10 2008 063 567 A1, DE 10 2007 021 625 A1.

*Primary Examiner* — Mary Cheung
*Assistant Examiner* — Yuen Wong
(74) *Attorney, Agent, or Firm* — Cantor Colburn LLP (57) ABSTRACT

The invention relates to a method for determining the absolute angular position of a steering wheel (3) of a vehicle, said method involving an initial-estimate step (a) during which a first value (Angle1) indicative of the absolute angular position of said steering wheel (3) is evaluated by a first model based on analyzing a first vehicle running dynamic parameter, such as the speed differential of the wheels of one wheelset, a second-estimate step (b) during which a second value (Angle2) indicative of the absolute angular position of said steering wheel is evaluated by a second model based on analyzing a second dynamic parameter, such as the yaw rate, followed by a checking step (c) during which the difference between the first value (Angle1) and the second value (Angle2) is compared against a predetermined consistency threshold (S) in order to decide, through suitable weighting, whether said values are to be considered or excluded.

11 Claims, 2 Drawing Sheets

(56) References Cited

FOREIGN PATENT DOCUMENTS

| EP | 1375304 | A2 | | 1/2004 |
|---|---|---|---|---|
| FR | 2953181 | A1 | | 6/2011 |
| WO | WO 2011067523 | A1 | * | 6/2011 |

* cited by examiner

METHOD FOR DETERMINING THE ABSOLUTE ANGULAR POSITION OF THE STEERING WHEEL OF A MOTOR VEHICLE

TECHNICAL FIELD

The present invention relates to the general field of power-assisted steering devices, and in particular electrical power-assisted steering devices, intended to facilitate the maneuvering of motor vehicles.

More particularly, it concerns a method for determining the absolute position of the steering wheel for vehicles equipped with such power-assisted steering.

BACKGROUND

This information of angular position of the steering wheel can indeed be necessary for the fulfillment of various embedded functions, such as the automatic return of the steering to the midpoint, the controlling of the indicators of change in direction or the controlling of orientation of directional lamps, the intelligent parking assistance, etc.

As such, it is known, from the patent application FR-2 953 181, filed by the applicant, to use an algorithm which allows to define the multi-revolution instantaneous absolute position of the steering wheel.

According to this algorithm, the relative angular position of said steering wheel is first of all measured, by means of a sensor of the "resolver" type placed on the shaft of the assist motor coupled to the steering column, then is added to this relative measurement, to obtain the absolute position of the steering wheel, a corrective offset value which is calculated as the weighted average of the successively observed differences, gradually with the iterations, between on the one hand the value of the relative angular position measured in the considered iteration, and on the other hand an estimation of the absolute angular position of the steering wheel, obtained indirectly by applying laws involving dynamic running parameters, such as the speed difference between the rear wheels, reported by the anti-lock braking system ABS, or even the instantaneous yaw rate, provided by the trajectory control system ESP.

To these differences are assigned, for calculating the eventually retained offset, weighting coefficients that can be interpreted as a confidence index as to the accuracy of the estimation of the absolute angular position, according to the running conditions and the origin of the parameter used for the calculation.

Such an algorithm, called "angle finding" algorithm, presents undeniable advantages, particularly in that it allows to avoid the presence of an additional sensor that would be intended to directly measure the multi-revolution absolute angular position of the steering wheel, or even the need to make the vehicle run in a sustainable manner under particular conditions, and particularly in a straight line, to allow the initialization of the process of determining said absolute angular position.

However, the accuracy of said algorithm can sometimes, especially in extreme cases, deteriorate due to the fact that one or the other of the used dynamic models have reached their limits of validity.

BRIEF SUMMARY

The invention aims therefore at overcoming the aforementioned drawbacks and proposing an improved method for determining the angular position of the steering wheel of a vehicle, which presents improved accuracy, reliability and robustness, while maintaining a relative simplicity of implementation.

The invention provides a method for determining the absolute angular position of a steering wheel of the vehicle characterized in that it comprises a step (a) of a first estimation of the absolute position during which a first value representative of the absolute angular position of said steering wheel is evaluated by means of a first model based on the analysis of at least one first dynamic running parameter of the vehicle, a step (b) of a second estimation of the absolute position during which a second value representative of the absolute angular position of said steering wheel is evaluated by means of a second model, distinct from the first model and based on the analysis of at least one second dynamic running parameter of the vehicle, then a step (c) of verification during which the difference between the first value and the second value is calculated and during which this difference is compared to a predetermined coherence threshold.

Advantageously, the implementation of a verification step according to the invention allows to very easily and quickly verify, without having to resort to other external signals, nor a fortiori to other specific sensors, the coherence of the angular position values one with the other resulting from the application of two distinct dynamic models.

Indeed, the inventors have observed that, when these values, originating each from a distinct model, are consistent one with the other, that is to say that the possible difference that differentiates said values is lower than the chosen coherence threshold, this indicates that the life situation of the vehicle, that is to say the conditions of running in which said vehicle were moving at the considered instant, were in fact compatible with the application of said models at said considered instant, and corresponded well and truly to the specific validity fields of said models allowing to consider results of said models as relevant, and of reliable accuracy.

Conversely, if the verification step observes a too high deviation between the two representative values of the absolute angular position, in this case a difference greater than the fixed coherence threshold, this means that there is a real risk that the evaluation obtained by either of the models will be distorted, and that the calculated value does not present therefore sufficient accuracy and reliability.

The comparison of the difference between the two calculated values on the one hand and the coherence threshold on the other hand allows thus deciding in full knowledge either to maintain said calculated values, if they are deemed coherent with one another and thus generally reliable, or on the contrary ruling out values that are deemed questionable, which could distort the final result of the algorithm of determining the absolute position value of the steering wheel.

More particularly, it will therefore be conceivable, depending on whether the newly calculated values appear reliable or not, to favor the use of these values so that they contribute in fine-tuning the algorithm by iterative learning, or on the contrary to favor their exclusion to prevent them from perturbing said learning.

Where appropriate, in case of exclusion of values in iteration, learning can "be frozen" and the estimation of the absolute position determined in the previous iteration can be temporarily maintained, and then learning can be resumed in a subsequent iteration, as soon as new coherent values will be made by the dynamic models of.

Therefore, the invention allows advantageously to improve the accuracy and the robustness of the method for determining the absolute position of the steering wheel, and this advantageously in a quick and easy manner, without slowing down the implementation of the algorithm, and in particular without requiring the collection of additional information or additional external signals to verify the reliability of the calculated values.

BRIEF DESCRIPTION OF THE DRAWINGS

Other purposes, characteristics and advantages of the invention will appear in more detail while reading the description which follows, as well as the accompanying drawings, provided for purely illustrative and not restrictive purposes, among which.

DETAILED DESCRIPTION

The present invention concerns a method for determining the absolute angular position of a steering wheel of a vehicle, and more particularly a steering wheel belonging to a power-assisted steering system 1, preferably an electrical power-assisted steering system.

Figure 1:
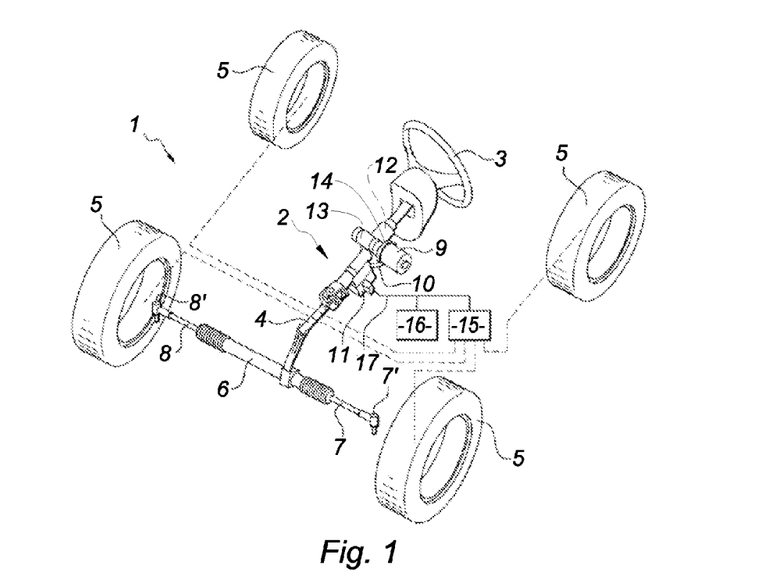
FIG. 1 illustrates, in a schematic perspective view, the implementation of a method in accordance with the invention within a motor vehicle.

As such, it will be considered in what follows, for convenience, that, as shown in FIG. 1, said steering 1 comprises on the one hand a mechanical part, generally designated by the number reference 2, which includes a steering wheel 3 connected to a steering column 4, the end of which far from the steering wheel 3 carries a steering pinion engaging a rack (not visible) mounted in a steering housing 6.

The two opposite ends of said rack are respectively connected, via left 7 and right 8 tie rods, equipped respectively at their outer end with a left 7' and 8' right steering ball joint, to the hub-carriers (not shown) of the left and right steered wheels of the vehicle.

Advantageously, the steering 1 can comprise, to assist the manual force exerted by the vehicle driver on the steering wheel 3, an assist two-way rotation electric motor 9, the output shaft of which is coupled, via a reducer 10, for example with worm and worm wheel, with the steering column 4, so as to be able to transmit a motor torque or possibly a resistant torque, to said steering column 4.

The assist electric motor 9 is driven by an embedded electronic computer 11 connected to a Controller Area Network (CAN) 17 of the vehicle allowing it to receive and to process various signals from various sensors monitoring various parameters of behavior of the vehicle and its members.

According to a known embodiment, said computer 11 can receive an electrical signal originating from a dedicated sensor 12 informing said computer of the relative, absolute, or multi-revolution absolute steering angle of the steering wheel 3, representative of the actual instantaneous angle of steering of the vehicle.

Said computer 11 also receives preferably a signal measuring the torque exerted by the driver on the steering wheel 3.

In the sense of the invention, said steering-wheel torque can of course be reported by any appropriate means of acquisition. Therefore, it can preferably be reported, and more particularly directly measured, by a torque sensor 13, for example placed on the steering column 4 or any other appropriate location. Said steering-wheel torque can also be indirectly obtained, where appropriate, by an evaluation based on the processing, by an appropriate computer, of other available signals.

From these information, the computer 11 drives the assist motor 9, by imposing at all times appropriate instructions, such as a torque or a force of assistance of the motor 9, which can amplify or on the contrary compensate the force applied by the driver on the steering wheel, according to laws of assistance predefined and programmed in a non-volatile memory of said computer 11.

According to another embodiment, particularly adapted for the method in accordance with the invention, the dedicated sensor 12 is suppressed and the data of an angular sensor 14 of the electric power-assisted steering system 1, of the "resolver" type, is used, associated with the shaft of the assist motor 9 in order to detect the angular position of the latter.

The multi-revolution relative angular position $\theta_{relative\_steering\_wheel}$ of the steering wheel 3 can then be determined by the following formula, as it is particularly detailed in the application FR-2 953 181, mentioned above:

$$\theta_{relative\_steering\_wheel} = \frac{\theta_{mono\_elec} + N_{elec\_revolutions} \times 360}{\Gamma \times p}$$

where:

$\theta_{mono\_elec}$ represents the absolute "electrical angle", that is to say the measurement of the absolute angular position of the motor shaft in an "electrical revolution", that is to say in a displacement cycle comprised between two successive stator poles of the motor, and the value of which is conventionally comprised between 0 deg and 359 "electrical" deg, bearing in mind that the relationship between the electrical angle and the mechanical angle of the rotor $\theta_{mono\_meca}$ is given by $\theta_{mono\_elec} = p \times \theta_{mono\_elec}$;

$N_{elec\_revolutions}$ represents the number of "electrical" revolutions made by the shaft of the motor, this variable being incremented by 1 (one unit) with each passage of $\theta_{mono\_elec}$ from 359 deg to 0 deg, or decremented at each passage of $\theta_{mono\_elec}$ from 0 deg to 359 deg;

p is the number of pairs of stator poles of the assist motor 9;

$\Gamma$ is the reduction ratio of the reducer 10.

Note that this relative measurement is preferably initialized at the start-up of the vehicle, the number of revolutions $N_{elec\_revolutions}$ being placed at zero. The value of the mono-revolution electrical position $\theta_{mono\_elec}$, has for its part an initial value which can be comprised between 0 deg and 359 deg, and which reflects the orientation of the steering wheel at the moment of said start-up.

Thus, at start-up (at the initialization), the initial measurement of the multi-revolution relative angular position of the steering wheel $\theta_{relative\_steering\_wheel}$ becomes equal to:

$$\theta_{relative\_steering\_wheel}(0) = \frac{\theta_{mono\_elec}(0)}{\Gamma \times p}$$

The value of the multi-revolution angular position moreover can never be greater than the maximum angular travel of the steering wheel 3 from stop to stop.

Figure 2:
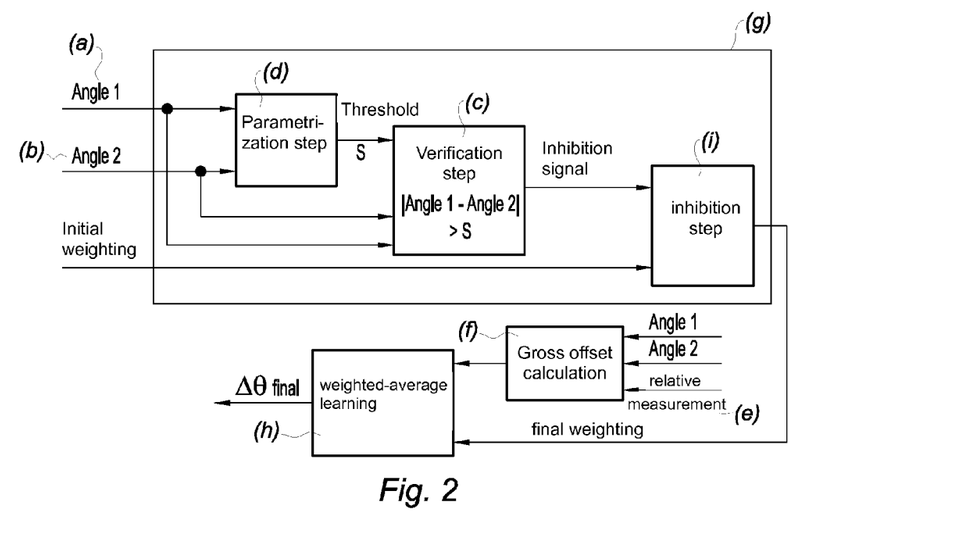
FIG. 2 illustrates, in a functional block diagram, the progress of a method in accordance with the invention, in particular the steps of verification of coherence and inhibition.

According to the invention as is particularly illustrated in FIG. 2, the method comprises a step (a) of a first estimation of the absolute position during which a first value Angle1 representative of the absolute angular position of the steering wheel 3 is evaluated by means of a first model based on the analysis of at least one first dynamic running parameter of the vehicle, a step (b) of a second estimation of the absolute position during which a second value Angle2 representative of the absolute angular position of said steering wheel is evaluated by means of a second model, distinct from the first model and based on the analysis of at least one second dynamic running parameter of the vehicle, advantageously distinct itself from the first parameter, then a step (c) of verification during which the difference between the first value Angle1 and the second value Angle2 is calculated and during which this difference is compared with a predetermined coherence threshold S.

Preferably, the first model uses as a first dynamic parameter the speed difference between the left and right wheels 5 of at least one running gear of the vehicle, the values of said speeds of the wheels 5 being preferably made available, in this case on the network CAN 17, by an anti-lock braking system (ABS) 15.

More particularly, said model can be based on the Jeantaud-Ackerman analysis, applied here for convenience to the rear wheels, but valid using the speeds of other wheels.

Therefore, the average speed of the rear wheels is obtained by the formula:

$$V_{average\ rear} = \frac{V_{rear\ left\ wheel} + V_{rear\ right\ wheel}}{2}$$

The speed difference E of the rear wheels can therefore be written as:

$$E_{speed\ rear} = V_{rear\ left\ wheel} - V_{rear\ right\ wheel}$$

The sign of this difference gives the instantaneous sign of the steering, conventionally positive when the steering wheel 3 is turned to the right, and negative when said steering wheel is turned to the left.

It is also conceivable, where appropriate, to correct the speeds of the wheels in order to take account for example of a running with a deflated tire, as described in the abovementioned application.

Knowing the constant value of the rear track width of the vehicle, the instantaneous radius R of the trajectory of said vehicle is calculated by the following formula:

$$R = \frac{V_{average\ rear}}{E_{speed\ rear}} \times \text{Track}_{rear}$$

The radius R being determined, and knowing the wheelbase L of the vehicle, the Ackerman angle, corresponding to the average steering angle of the steered wheels, is calculated as follows:

$$\alpha_{Acker\ man} = \frac{L}{R}$$

The lateral acceleration $\gamma_{lateral}$ of the vehicle, estimated from the instantaneous radius and the average speed of the vehicle, allows to calculate, knowing the under-steer gradient K, the theoretical average slip angle of the tires:

$$\gamma_{lateral} = \frac{(V_{average\ rear\ wheel})^2}{R}$$

$$\alpha_{theoretical\ slip} = K(R) \times \gamma_{lateral}$$

The relationship between the under-steer gradient K and the steering radius R is unique to each type of vehicle. It can be advantageously reported in the form of an abacus stored in non-volatile memory of the computer.

The theoretical average slip angle is then corrected by a corrective gain G, which depends on the lateral acceleration of the vehicle:

$$\alpha_{slip} = G_{corrective} \times \alpha_{theoretical\ slip}$$

Finally, the average steering angle of the steered wheels is equal to the sum of the Ackerman angle and the corrected average slip angle of the tires:

$$\alpha_{steered\ wheels} = \alpha_{Ackerman} + \alpha_{slip}$$

Now, there is a relationship between the absolute angular position of the Angle1 steering wheel and the steering angle of the steered wheels, characteristic of each type of vehicle. This relationship can advantageously be reported in the form of an abacus stored in non-volatile memory in the computer 11:

$$\text{Angle1} = f(\alpha_{steered\ wheels})$$

Preferably, the second model uses, as a second dynamic parameter, the yaw rate of the vehicle and/or the lateral acceleration of said vehicle, said second parameter being preferably made available by a trajectory control system (ESP) 16.

It is indeed possible to obtain the same relationship as the one described above, in this case for the second value Angle2, from one and/or the other of these information on yaw rate or lateral acceleration periodically provided to the computer 11 by the ESP.

Thus, the instantaneous radius R of the trajectory of the vehicle running at a speed V can be calculated from the yaw rate Ψ' of said vehicle, using the formula:

$$R = \frac{V_{vehicle}}{\Psi'}$$

and/or from the lateral acceleration of said vehicle, using the formula:

$$R = \frac{(V_{vehicle})^2}{\gamma_{lateral}}$$

Knowing the value of the radius R, the determination process presented above shall apply then mutatis mutandis to obtain the steering angle of the wheels and deduce the (second) value of the angular position of the steering wheel Angle2.

Advantageously, the models used allow calculating an estimation of the absolute angular position of the steering wheel angle by means of signals already available on the on-board network CAN, without requiring for example a dedicated sensor, so that the arrangement of the power-assisted steering system 1 and the implementation of the method are lightened and simplified.

Once the values representative of the absolute position of the steering wheel by the dynamic models are calculated, is then tested, during the verification step(c), the coherence between these two values Angle1, Angle2, estimated each according to a different model but both supposed to represent the same physical quantity of the absolute angular position of the steering wheel.

Moreover, in a particularly preferable manner, the method in accordance with the invention includes a parameterization step (d) in which is adjusted, prior to the verification step, and after steps (a) and (b) of estimation of absolute position, the coherence threshold S depending on the lowest of the first and second values representative of the absolute angular position of the steering wheel, that is to say depending on MIN [Angle1; Angle2].

Therefore, the sensitivity and severity of the verification can be advantageously finely adjusted, and consequently the accuracy and reliability of the algorithm, by modifying in real time the coherence threshold S, which constitutes the decision criterion as to the reliability of the estimated absolute position values, in order to adapt said threshold to the order of magnitude of the smallest of said values of absolute position Angle1, Angle2 estimated in the considered iteration.

In particular, in the presence of a low minimum value of absolute position, said threshold S can be lowered in order to make the coherence test more restrictive, and on the contrary raise said threshold S when there is a greater minimum value.

For example, if the smallest of the values representative of the absolute position MIN [Angle1; Angle2] corresponds to an angle less than 100 deg, a difference of up to 5 deg or even 15 deg can be tolerated between the first and second value, the threshold S can therefore be substantially comprised between 5 deg and 15 deg.

If said smallest value corresponds to an angle greater than 360 deg, a difference of up to 30 deg, or even 40 deg can be tolerated.

Between 100 deg and 360 deg, as a first approximation, a law of interpolation, linear for example, can be used to fix the threshold.

However, these values are likely to evolve depending on the sought performance/robustness compromise.

Preferably, the method in accordance with the invention comprises a step (e) of measuring of a relative angular position $\theta_{relative\_steering\_wheel}$ during which, using an embedded sensor 14, preferably initialized at the start-up of the vehicle, a value representative of the multi-revolution relative angular position $\theta_{relative\_steering\_wheel}$ of the steering wheel 3 is measured, as has been detailed above.

More particularly, the value representative of the relative angular position $\theta_{relative\_steering\_wheel}$ can be measured by an angular position sensor of the "resolver" type, or any similar inductive sensor, associated with the shaft of the power-assisted steering motor 9.

Said method preferably includes afterwards a step (f) of calculation of the gross dynamic offset $\Delta\theta_{dynamic(i)}$ in which a first dynamic offset value $\Delta\theta_{dynamic(1)}$ is calculated, respectively a second dynamic offset value $\Delta\theta_{dynamic(2)}$, corresponding to the difference between the first value Angle1 representative of the absolute angular position, respectively the second value Angle2 representative of the absolute angular position, and the value representative of the relative position $\theta_{relative\_steering\_wheel}$, measured for the current iteration n:

$$\Delta\theta_{dynamic(i)} = \text{Angle}(i) - \theta_{relative\_steering\_wheel}$$

The method preferably includes afterwards a weighting step (g) during which each dynamic offset value $\Delta\theta_{dynamic(i)}$ is appointed to a unique weighting coefficient $pond_i(n)$, then a learning step (h) where a final offset value $\Delta\theta_{final}(n)$ is calculated for the current iteration n, which corresponds to the weighted average of the final offset value calculated in the previous iteration $\Delta\theta_{final}(n-1)$ and appointed to the score $sc(n-1)$ corresponding to the integral sum of the weighting coefficients used successively in all of the previous iterations on the one hand, and the first and second dynamic offset values newly calculated for the current iteration $\Delta\theta_{dynamic(i)}(n)$ and appointed to their respective weighting coefficient $pond_i(n)$ on the other hand, which can be written as:

$$\Delta\theta_{final} = \frac{\Delta\theta_{final}(n-1) \times sc(n-1) + \sum_{i=1}^{2} \Delta\theta_{dynamic(i)} \times pond_i(n)}{sc(n-1) + \sum_{i=1}^{2} pond_i(n)}$$

$$sc(n) = sc(n-1) + \sum_{i=1}^{2} pond_i(n)$$

Therefore, the offset value $\Delta\theta_{final}(n)$ finally retained as representative of the shift between the actual multi-revolution absolute position $\theta_{absolute\_multi-revolution\_steering\_wheel}$ of the steering wheel and the relative angular position $\theta_{relative\_steering\_wheel}$ measured by the sensor 14 corresponds to a learning of the weighted average type, the value of which evolves and becomes finer gradually with the iterations, thanks to the successive input of the different intermediate weighted values $\Delta\theta_{dynamic(i)} \times pond_i(n)$, estimated using the dynamic models.

Ultimately, in the iteration n, the multi-revolution absolute position of the steering wheel is considered as the sum of the measured relative value and the final offset value:

$$\theta_{absolute\ multiturn\ steering\ wheel}(n) = \theta_{relative\ steering\ wheel}(n) + \Delta\theta_{final}(n)$$

In a particularly preferable manner, the method comprises, when the difference |Angle1−Angle 2| between the first value and the second value representative of the absolute angular position of said steering wheel exceeds the predetermined coherence threshold S, an inhibition step (i) that forces the zero setting of the weighting coefficient, and more particularly both of the weighting coefficients $pond_1(n)$, $pond_2(n)$ associated with the corresponding dynamic offset value, or more particularly with the corresponding dynamic offset values $\Delta\theta_{dynamic(1)}$, $\Delta\theta_{dynamic(2)}$, for the execution of the learning step (h).

In other words the inhibition step allows, by zero-setting the weighting coefficients ($pond_i(\underline{n})=0$) in the concerned iteration n, to force the elimination of the concerned offset values.

Such a selection advantageously allows to maintain, in the expression serving to calculate the weighted average, only the terms of the offset values (and thus, indirectly, the absolute angle they represent) that are considered coherent, and thus reliable, and that are appointed as such to a non-zero weighting coefficient, and exclude in contrast, by a zero weighting, the terms deemed questionable, corresponding to values deemed of low reliability because resulting a priori from the application of both or either of the dynamic models to a particular life situation of the vehicle, situated on the limit or even beyond the field of acceptable validity or accuracy of the considered model, the calculated values therefore being potentially too inaccurate or affected by too much uncertainty.

In other words, the invention advantageously proposes, more generally, a method comprising at least one, and preferably two, steps (a, b) of estimation of the absolute position, a step (c) of verification of the coherence of the thus estimated value(s) representative of the absolute angular position of the steering wheel, then an inhibition step (i) allowing to exclude, preferably by an appropriate selective weighting, the thus estimated value(s) if these are deemed incoherent, in order not to take account for uncertain values in the assessment of the situation of the vehicle and the state of the steering.

In the preferred embodiment, two estimation steps (a, b), by two distinct dynamic models, are necessary, the verification (c) of the mutual coherence of the values representative of the absolute angular position of the steering wheel being achieved just by comparing said two values one to the other, wherein said two values are obtained by different modelizations.

Similarly, in this preferred embodiment, detecting incoherence between the first and the second value has the consequence of zero-setting the two associated weighting coefficients, and therefore the pure and simple elimination of the weighted-average learning calculation of each of these two values.

It will be noticed that such a method of grouped and united selection, of the all-or-nothing type, can either maintain the two values, if these are coherent one relatively to the other, or eliminate both of said two values, if they are incoherent, without it being necessary or even useful to seek to determine, in absolute terms and in a separate manner, the individual reliability of each of said values. This greatly simplifies of course the implementation of the invention.

Figure 3:
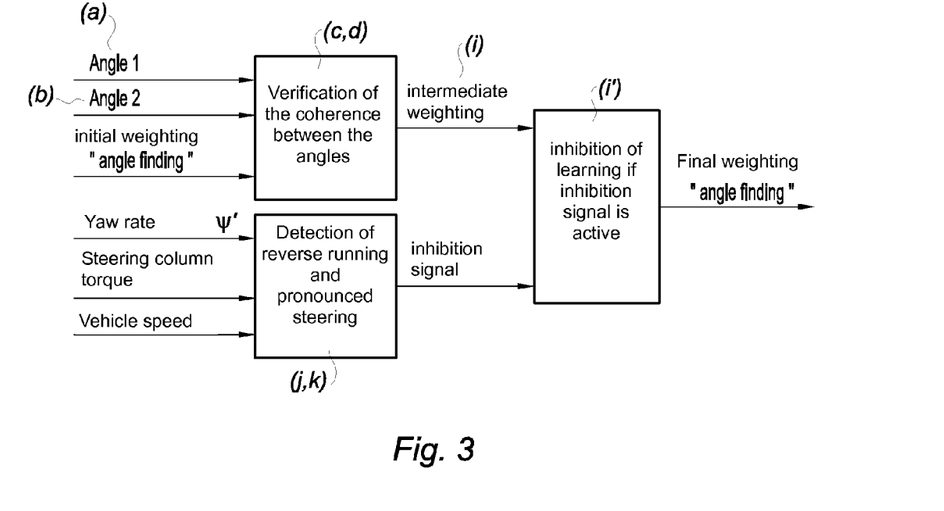
FIG. 3 illustrates, in a functional block diagram, an embodiment of the method in accordance with the invention coupling two conditions of inhibition of the learning of the algorithm.

By default, in case of an inhibition of the estimated values in the current iteration $\underline{n}$, the final offset established in the previous iteration $\Delta\theta_{final}(n-1)$ is maintained. In such cases, the offset remaining fixed, the possible variations in the absolute angular position of the steering wheel arising between the previous iteration n−1 and the current iteration $\underline{n}$ will be reflected by the evolutions observed between the measured values of relative position, in each corresponding iteration, by the resolver 14: $\theta_{relative\_steering\_wheel}(n) - \theta_{relative\_steering\_wheel}(n-1)$ According to an embodiment which may constitute an invention in its own right, the method includes, as shown in FIG. 3, a step (j) of detection of the direction of longitudinal displacement of the vehicle, and a step (k) of detection of a situation turning beyond a predetermined turning threshold.

The detection of reverse running can in particular take place by the joint monitoring of a first signal corresponding to the torque exerted on the steering wheel, for example reported by the sensor 13, and a second signal corresponding to the yaw rate provided by the ESP, since a sign similarity between these two signals indicates a forward displacement, whereas a difference in sign between these two signals indicates a reverse running, and a change of sign of the yaw rate signals a change of the direction of displacement provided that the vehicle speed crosses zero.

Indeed, the inventors have discovered that the second model, when based on the analysis of the yaw rate $\Psi'$ of the vehicle, can be inaccurate or even wrong, in an unfavorable life situation corresponding to the combination of a reverse running and a pronounced turning ("pronounced steering"), and it is thus useful to detect such a situation to treat it properly.

Thereby, the method can advantageously comprise, when a reverse running and turning maneuver is detected, an inhibition step (i') that forces the zero setting, for the execution of the learning step (h), of at least the weighting coefficient pond$_2$(n) associated with the second value of the dynamic offset $\Delta\theta_{dynamic(2)}$ resulting from the application of the second model using as a second dynamic parameter the yaw rate $\Psi'$, or even all of the weighting coefficients associated with the different values estimated by the different dynamic models.

Therefore, the method can have an additional possibility of inhibition (i'), based on the detection of the direction of displacement, and taking place where appropriate in series with a first inhibition step (i) placed under the dependence of a coherence verification step (c) as described above, which further enhances the reliability of said method by ruling out the values acquired in certain unfavorable life situations on the application of the concerned model.

Of course, the different dispositions described above can advantageously be combined and accumulated to enhance the robustness and reliability of the "angle finding" algorithm.

More particularly, the steps that are characteristic of the method, and in particular the steps (c) of verification, (i) and/or (i') of inhibition, or even (j) and (k) of detection of steering in reverse running, can advantageously be inserted, where appropriate, as a retrofitting, into a first-generation angle-finding algorithm, to complete the latter by adding to it a conditional inhibition function(s), allowing to modify, and more particularly to set to zero, in the event of detection of an incoherence and/or a risk of lack of reliability of the model, the initial weighting coefficients ("initial weighting") that said algorithm normally proposes, on the basis of predetermined abacus ("scores charts"), as described in the patent application FR-2 953 181.

Therefore, as to whether the absolute position values Angle1, Angle2 estimated by the dynamic models will be deemed coherent or not, the initial weighting coefficients can be preserved, or on the contrary set to zero, the result comprised of the "final weighting" indicated in FIGS. 2 and 3, final weighting that is then taken into consideration for the execution of the learning step (h).

Advantageously, the method in accordance with the invention presents therefore an increased reliability and accuracy, based in particular on the complementarity of the plurality of the dynamic models used, which allows a self-monitoring of the coherence of the results which are obtained by application of said models.

Of course, the invention is not limited to a particular embodiment, the one skilled in the art having in particular the possibility to isolate or combine together the different characteristics described above, and for example to employ other models, in particular dynamic models, allowing to determine indirectly, from any useful signal present on the on-board network 17, an estimation of the absolute angular position of the steering wheel 3.

Furthermore, the present invention concerns of course a motor vehicle, and in particular a land motor vehicle intended for the individual or collective transportation of persons or goods, which embeds a computer 11 arranged or programmed to implement a method as described above.

The invention finally concerns a computer program containing computer-program code elements allowing to implement a method in accordance with the invention when said program is executed on a computer, as well as a data medium readable by a computer 11, of the disk, flash memory, USB key, etc. kind containing computer-program code elements allowing to implement such a method when said medium is read by a computer.

The invention claimed is:

1. A method of determining an absolute angular position of a steering wheel of a vehicle with a vehicle computer, the method comprising:
providing the vehicle computer with at least one predetermined coherence threshold value (S), at least one first dynamic running parameter of the vehicle, and at least one second dynamic running parameter of the vehicle;

controlling the steering wheel of the vehicle with the following steps:
a step (a) comprising first estimation of an absolute position during which a first value (Angle1) which is representative of the absolute angular position of said steering wheel is evaluated by the vehicle computer using a first model based on an analysis of said at least one first dynamic running parameter of the vehicle;
a step (b) comprising second estimation of the absolute position during which a second value (Angle2), which is representative of the absolute angular position of said steering wheel, is evaluated by the vehicle computer using a second model based on analysis of said at least one second dynamic running parameter the vehicle, wherein the second model is distinct from the first model, and wherein both the first value (Angle1) and the second value (Angle2) are theoretically estimated absolute angular positions that are not measured by a vehicle sensor; and
a verification step (c) during which the vehicle computer calculates a difference between the first value (Angle1) and the second value (Angle2) and compares the difference with the predetermined coherence threshold ($S$) which represents a same physical quantity of the absolute angular position of the steering wheel of the vehicle.

2. The method according to claim 1 further comprising a parameterization step (d) during which, prior to the verification step, the coherence threshold ($S$) is adjusted depending on the lowest of the first and second values representative of the absolute angular position of the steering wheel (MIN [Angle1;Angle2]).

3. The method according to claim 1 further comprising comprising:
a step (e) for measuring a relative angular position in which, using an embedded sensor, a value representative of a multi-revolution relative angular position ($\theta_{relative\_steering\_wheel}$) of the steering wheel is measured, then
a step (f) of calculation of gross dynamic offset, during which a first dynamic offset value ($\Delta\theta_{dynamic(1)}$) is calculated, respectively a second dynamic offset value ($\Delta\theta_{dynamic(2)}$), corresponding to the difference between the first value (Angle1) representative of the absolute angular position, respectively the second value (Angle2) representative of the absolute angular position, and the value representative of the relative position ($\theta_{relative\_steering\_wheel}$) measured for the current iteration, then
a weighting step (g) during which each dynamic offset value is appointed a unique weighting coefficient ($\text{pond}_i(n)$), then
a learning step (h) where a final offset value ($\Delta\theta_{final}(n)$) is calculated for the current iteration ($\underline{n}$), which corresponds to a weighted average of the offset value calculated in a previous iteration ($\Delta\theta_{final}(n-1)$) and appointed to a score ($\text{sc}(\underline{n}-1)$) corresponding to a integral sum of the weighting coefficients used successively in all the previous iterations on the one hand, and the first and second dynamic offset values newly calculated for the current iteration ($\Delta\theta_{dynamic(i)}(n)$) and appointed to their respective weighting coefficient ($\text{pond}_i(n)$) on the other hand.

4. The method according to claim 3 wherein, when the difference (|Angle1−Angle2|) between the first value and the second value representative of the absolute angular position of the steering wheel exceeds the predetermined coherence threshold ($S$), an inhibition step (i) that forces a zero setting of the weighting coefficients ($\text{pond}_1(n), \text{pond}_2(n)$) associated with the corresponding dynamic offset values ($\Delta\theta_{dynamic(1)}, \Delta\theta_{dynamic(2)}$), for the execution of learning step (h).

5. The method according to claim 3 wherein the value representative of the relative angular position is measured by an angular position sensor associated with a shaft of a power-assisted steering motor.

6. The method according to claim 5, wherein the angular position sensor is a resolver.

7. The method according to claim 1, wherein the first model uses as first dynamic parameter a speed difference between a left wheel and a right wheel of at least one running gear of the vehicle.

8. The method according to claim 1, wherein the second model uses as a second dynamic parameter a yaw rate ($\Psi'$) of the vehicle and/or a lateral acceleration ($\gamma_{lateral}$) of the vehicle.

9. The method according to claim 8, further comprising
a step (e) for measuring a relative angular position in which, using an embedded sensor, a value representative of a multi-revolution relative angular position ($\theta_{relative\_steering\_wheel}$) of the steering wheel is measured, then
a step (f) of calculation of gross dynamic offset, during which a first dynamic offset value ($\Delta\theta_{dynamic(1)}$) is calculated, respectively a second dynamic offset value ($\Delta\theta_{dynamic(2)}$), corresponding to the difference between the first value (Angle1) representative of the absolute angular position, respectively the second value (Angle2) representative of the absolute angular position, and the value representative of the relative position ($\theta_{relative\_steering\_wheel}$) measured for the current iteration, then
a weighting step (g) during which each dynamic offset value is appointed a unique weighting coefficient ($\text{pond}_i(n)$), then
a learning step (h) where a final offset value ($\Delta\theta_{final}$) is calculated for the current iteration ($\underline{n}$), which corresponds to a weighted average of the offset value calculated in a previous iteration ($\Delta\theta_{final}(n-1)$) and appointed to a score ($\text{sc}(\underline{n}-1)$) corresponding to a integral sum of the weighting coefficients used successively in all previous iterations, and the first and second dynamic offset values newly calculated for the current iteration ($\Delta\theta_{dynamic(i)}(n)$) and appointed to their respective weighting coefficient ($\text{pond}_i(n)$), the method further comprising
a step (j) of detecting a direction of longitudinal displacement of the vehicle, and
a step (k) of detecting a turning situation beyond a predetermined turning threshold, and further comprising, when a reverse running and turning maneuver is detected, an inhibition step (i') that forces a zero setting, for executing the learning step, of the weighting coefficient ($\text{pond}_2(n)$) associated with the second dynamic offset value ($\Delta\theta_{dynamic(2)}$) resulting from the application of the second model using the yaw rate as a second dynamic parameter.

10. A motor vehicle, comprising
a steering wheel;
an electric motor structured to assist rotation of the steering wheel; and
a vehicle computer arranged or programmed to implement a method of determining an absolute angular position of the steering wheel, the method comprising:
providing the vehicle computer with at least one predetermined coherence threshold value (S), at least one first dynamic running parameter of the vehicle, and at least one second dynamic running parameter of the vehicle;

controlling the steering wheel of the vehicle with the following steps:

a step (a) comprising first estimation of an absolute position during which a first value (Angle1) which is representative of the absolute angular position of said steering wheel is evaluated by the vehicle computer using a first model based on an analysis of said at least one first dynamic running parameter of the vehicle;

a step (b) comprising second estimation of the absolute position during which a second value (Angle2), which is representative of the absolute angular position of said steering wheel, is evaluated by the vehicle computer using a second model based on analysis of said at least one second dynamic running parameter the vehicle, wherein the second model is distinct from the first model, and wherein both the first value (Angle 1) ant the second value (Angle2) are theoretical estimated absolute angular positions that are not measured by a vehicle sensor; and a verification step (c) during which the vehicle computer calculates a difference between the first value (Angle1) and the second value (Angle2) and compares the difference with the predetermined coherence threshold (S) which represents a same physical quantity of the absolute angular position of the steering wheel of the vehicle.

11. A non-transitory computer-readable medium containing computer instructions stored therein for causing a vehicle computer processor to implement a method of determining an absolute angular position of a steering wheel of the vehicle when said medium is read by the vehicle computer, the method comprising:

providing the vehicle computer with at least one predetermined coherence threshold value (S), at least one first dynamic running parameter of the vehicle, and at least one second dynamic running parameter of the vehicle;

controlling the steering wheel of the vehicle with the following steps:

a step (a) comprising first estimation of an absolute position during which a first value (Angle1) which is representative of the absolute angular position of said steering wheel is evaluated by the vehicle computer using a first model based on an analysis of said at least one first dynamic running parameter of the vehicle;

a step (b) comprising second estimation of the absolute position during which a second value (Angle2), which is representative of the absolute angular position of said steering wheel, is evaluated by the vehicle computer using a second model based on analysis of said at least one second dynamic running parameter the vehicle, wherein the second model is distinct from the first model, and wherein both the first value (Angle 1) ant the second value (Angle2) are theoretical estimated absolute angular positions that are not measured by a vehicle sensor; and a verification step (c) during which the vehicle computer calculates a difference between the first value (Anglel) and the second value (Angle2) and compares the difference with the predetermined coherence threshold (S) which represents a same physical quantity of the absolute angular position of the steering wheel of the vehicle.

\* \* \* \* \*